3,565,648
// METHOD OF UTILIZING BLAST FURNACE SLAG AS A STRENGTH-IMPROVING AGENT FOR HARDENED CEMENT
// Toru Mori, Toru Iwai, Akihiko Yoda, and Masaaki Oshima, Tokyo, Japan, assignors to Kajima Construction Co., Ltd., Chuo-ku, Tokyo, Japan
// No Drawing. Filed Sept. 12, 1967, Ser. No. 667,074
// Claims priority, application Japan, Oct. 13, 1966, 41/60,108
// Int. Cl. C04b 7/14
// U.S. Cl. 106—89                      4 Claims

ABSTRACT OF THE DISCLOSURE

A method of improving the initial strength of hardened cement is provided, which comprises blending blast furnace slag or fly ash with gypsum, adding water, grinding the mixture, and adding the resultant mixture to a cement mix. The improved cement composition is likewise provided.

---

The present invention relates to a method of remarkably improving the initial strength of hardened cement. More precisely, it relates to a method of improving the initial strength of hardened cement by utilizing either blast furnace slag or fly ash and the resulting improved cement composition.

The strength of hydrated, hardened portland cement gradually increases over a period of a few weeks. This phenomenon is caused by a slow hydration of calcium silicate, the main component of portland cement. Calcium aluminate and calcium sulfate, which are auxiliary components of portland cement, are hydrated rather rapidly to produce a hydrate of calcium sulfoaluminate, which permits development of the initial strength of hardened portland cement. Therefore, one of the factors influencing the initial strength property of hydrated portland cement is thought to be the amount of the hydrate of calcium sulfoaluminate contained therein.

A cement has previously been produced which has an increased content of the hydrate of calcium sulfoaluminate in the form of hardened hydrates; this is a so-called non-shrinking or expansive cement. The cement of this type consists of portland cement containing the anhydride of calcium sulfoaluminate. In its hydrating process, formation of the hydrate of calcium sulfoaluminate is rather slow, and after cement hardens, the crystal of the hydrate of calcium sulfoaluminate begins to grow, whereby the hardened cement is expanded. The one-day strength of the hardened product of such expansive cement is, however, the same as or at most 1.2 times as high as that of the cement without the calcium sulfoaluminate. There is a further disadvantage with the cement of this type in that it costs considerably more than portland cement because of the utilization of specially burned products such as the anhydride of calcium sulfoaluminate.

After research on low cost admixtures which increase the content of the hydrate of calcium sulfoaluminate in hardened portland cement, and on a process which can bring about the rapid crystal formation of the hydrate, success has been achieved in increasing the one-day strength of the hardened portland cement by about 2.2 fold, by employing specially treated blast furnace quenched slag or fly ash.

According to the method of the present invention, blast furnace quenched slag or fly ash is blended with gypsum, and after adding water, the slurry is put in a rotary ball mill, a vibrating ball mill, or the like, to be sufficiently ground so as to cause the alumina and calcium sulfate to come in contact and react with each other. The ground slurry thus obtained is added to a cement mix composed of a mixture of cement, aggregate and blending water to form the hydrate of calcium sulfoaluminate by means of the reaction with calcium hydroxide released on hydration of the cement.

As indicated above, according to the method of the present invention, blast furnace slag or fly ash is blended with gypsum and other desired materials to form an admixture. The amount of blast furnace slag or fly ash utilized is generally within a range of from about 50% to about 90% of the total weight of the blast furnace slag or fly ash admixture, and is preferably within a range of about 60–80% by weight.

The amount of gypsum utilized is generally within a range of from about 5% to about 50% of the total weight of the blast furnace slag or fly ash admixture, and is preferably within a range of about 10–40% by weight.

After mixing the blast furnace slag or fly ash with the desired additional materials to obtain the admixture, water is added in an amount generally within a range of from about 50% to about 500% of the total weight of the blast furnace slag or fly ash admixture. Preferably, the amount of water utilized is about 60–200% by weight.

Preferably, in the case of mortar, the weight ratio of cement, water and aggregate is about 1:0.4 to 0.8:2 to 4, and in the case of concrete, the weight ratio of cement, water, fine aggregate and coarse aggregate is about 1:0.4 to 0.8:2 to 4:3 to 6.

The ground slurry is added to the cement mix in such proportion that the weight ratio of the cement to the admixture consisting of blast furnace slag or fly ash and any other materials, is generally within a range of from 50:50 to 95:5, and is preferably about 80:20.

In preparing the slurry of blast furnace slag or fly ash admixtures, the grinding must be sufficient to cause the alumina to react with the calcium sulfate. An insufficiently ground slurry would degrade the initial strength of the hardened material because of slow formation of the hydrate of calcium sulfoaluminate (slower than in the case of an expansive cement). Upon grinding, addition of calcium hydroxide (or calcium oxide or portland cement) and/or sodium sulfate is effective for accelerating the reaction of alumina with calcium sulfate. The amount of calcium hydroxide (or calcium oxide or portland cement) utilized according to this aspect of the invention is generally within a range of from about 0% to about 50% of the total weight of the blast furnace slag or fly ash admixture, and is preferably about 5–25% by weight.

When sodium sulfate is utilized, the amount is generally within a range of from about 0% to about 50% of the total weight of the blast furnace slag or fly ash admixture, and is preferably within the range of 5–25% by weight.

A portion of the gypsum component of the blast furnace slag or fly ash admixture may be replaced with calcium carbonate; in this case, the hydrate of calcium sulfocarboaluminate is thought to be formed. The amount of gypsum component to be replaced by calcium carbonate is generally within a range of from about 0% to about 50% by weight of the total admixture, and is preferably within the range of 5–25% by weight.

The compressive strength of mortar consisting of rapid-hardening portland cement to which admixtures were added according to the method of the present invention was tested according to JISR–5201. The results are shown hereinafter.

The slurry comprising the admixture that consists of blast furnace slag or fly ash and other materials is added to the cement mix in the proportion that the weight ratio of the cement to the admixture is about 80:20.

The cement composition resulting from the process of this invention comprises blast furnace slag or fly ash, a cement mix comprising cement, water and an aggregate and gypsum, either in the anhydrous or crystalline form. The cement composition may contain an accelerator such as calcium hydroxide (or calcium oxide or portland cement) or sodium sulfate, or a mixture of such accelerators. The cement composition may also contain calcium carbonate, which may be used for partial replacement of gypsum. The weight ratio of the cement to the admixture is from 50:50 to 95:5 and preferably about 80:20.

EXAMPLE

Blast furnace quenched slag (or fly ash) and other materials such as anhydrous gypsum (or crystalline gypsum), calcium hydroxide, sodium sulfate, and calcium carbonate were blended in the ratios shown in Table 1, to form an admixture weighing 4 kilograms. 2.6 kilograms (65% by weight of the admixture) of water were added to the admixture, and the resultant mixture was put in a rotary ball mill and ground for 1 hour. The ball mill used was a cylinder type having a 35 cm. diameter and a 35 cm. height; iron balls of 1 cm. diameter (the total weight of the balls used being 20 kilograms) were employed. After grinding, 188.76 grams of the obtained ground slurry (consisting of 114.4 grams of the admixture and 74.36 grams of water) were taken out, and blended with 405.6 grams of cement, 263.64 grams of water and 1040 grams of sand. The obtained cement mortar was then molded. The total weight of the cement and the admixture was 520 grams and the total weight of water was 338 grams; they met the specification of JISR–5201. Specimen No. 1 was the control which had not been treated according to the method of the present invention.

As is apparent from the results shown in Table 2, the initial strength of the hardened rapid-hardening cement is extremely increased by the treatment according to the method of the present invention.

TABLE 2.—COMPRESSIVE STRENGTH (kg./cm.$^2$)

| Number: | 1 day | 3 days | 7 days | 28 days |
|---|---|---|---|---|
| 1 | 91 | 205 | 322 | 442 |
| 2 | 175 | 299 | 352 | 468 |
| 3 | 197 | 331 | 376 | 494 |
| 4 | 202 | 363 | 410 | 518 |
| 5 | 118 | 220 | 333 | 455 |
| 6 | 159 | 254 | 345 | 470 |
| 7 | 189 | 326 | 377 | 496 |
| 8 | 158 | 231 | 335 | 457 |
| 9 | 172 | 263 | 348 | 467 |
| 10 | 170 | 282 | 346 | 472 |

What is claimed is:

1. A method for preparing a cement composition which comprises:
   (A) forming an admixture containing
      (i) from about 50 to about 90% by weight of a member selected from the group consisting of blast furnace slag, fly ash and mixtures thereof;
      (ii) from about 5 to about 50% by weight of (i) of anhydrite, and
      (iii) from about 0 to 50% by weight of (i) of an accelerator selected from the group consisting of calcium oxide, calcium hydroxide, sodium sulfate, and mixtures thereof;
   (B) ball milling or grinding the admixture of (A) with water in amount of about 50 to 500% by weight of said admixture to form a slurry, and
   (C) admixing the slurry of (B) with portland cement in the ratio about 50:50 to about 95:5 parts by weight of cement to admixture of (A).

2. The process of claim 1 wherein in step (A) the blast furnace slag, fly ash or mixtures thereof is present at 60 to 80% by weight, the anhydrite is present from about 10 to 40% by weight of (i), the accelerator is present at about 5 to 25% by weight of (i); and the water of step (B) employed in slurrying is present at about 60 to 200% by weight and the weight ratio of cement to admixture of step (C) is about 80:20.

3. The product of the process of claim 1.

4. The product of the process of claim 2.

TABLE 1.—RATIOS OF CEMENT AND ADMIXTURES, PERCENT

| Number: | Rapid-hardening cement | Blast furnace slag | Fly ash | Anhydrous gypsum | Crystalline gypsum | Sodium sulfate | Calcium carbonate | Calcium hydroxide |
|---|---|---|---|---|---|---|---|---|
| 1 | 100 | 0 | 0 | 0 | 0 | 0 | 0 | 0 |
| 2 | 78 | 16 | 0 | 5 | 0 | 0 | 0 | 1 |
| 3 | 78 | 16 | 0 | 4 | 0 | 1 | 0 | 1 |
| 4 | 78 | 16 | 0 | 3 | 0 | 2 | 0 | 1 |
| 5 | 78 | 0 | 5 | 15 | 0 | 1 | 0 | 1 |
| 6 | 78 | 0 | 10 | 10 | 0 | 1 | 0 | 1 |
| 7 | 78 | 0 | 15 | 5 | 0 | 1 | 0 | 1 |
| 8 | 78 | 16 | 0 | 0 | 5 | 0 | 0 | 1 |
| 9 | 78 | 16 | 0 | 0 | 4 | 0 | 1 | 1 |
| 10 | 78 | 16 | 0 | 0 | 3 | 0 | 2 | 1 |

References Cited

UNITED STATES PATENTS

| 1,334,272 | 3/1920 | Shinn | 106—117 |
| 1,748,839 | 2/1930 | Grunewald | 106—97 |
| 2,248,032 | 7/1941 | Dunn et al. | 106—97 |
| 2,302,988 | 11/1942 | Witty | 106—117 |
| 2,597,370 | 5/1952 | Peckman | 106—117 |
| 2,752,261 | 6/1956 | Downaud | 106—117 |
| 2,967,780 | 1/1961 | Schneiter et al. | 106—117 |
| 3,155,526 | 11/1964 | Klein | 106—89 |

FOREIGN PATENTS

| 546,628 | 7/1942 | Great Britain | 106—103 |
| 546,629 | 7/1942 | Great Britain | 106—103 |

OTHER REFERENCES

Lea and Desch: "The Chemistry of Cement and Concrete" (1956), pp. 397, 415 and 416.

TOBIAS E. LEVOW, Primary Examiner

W. T. SCOTT, Assistant Examiner

U.S. Cl. X.R.

106—97, 103, 117